Dec. 31, 1968

M. C. SICARD 3,419,703

ELECTRIC CIGAR LIGHTERS

Filed Aug. 8, 1966

INVENTOR.
MARCEL CLARENCE SICARD
BY
*Murray Schaffe*
ATTORNEY

United States Patent Office 3,419,703
Patented Dec. 31, 1968

3,419,703.
ELECTRIC CIGAR LIGHTERS
Marcel Clarence Sicard, Cheshire, Conn., assignor to American Machine & Foundry Company, a corporation of New Jersey
Filed Aug. 8, 1966, Ser. No. 570,969
6 Claims. (Cl. 219—265)

ABSTRACT OF THE DISCLOSURE

A thermostatically controlled electric cigar lighter for automobiles and the like, having an electric cigar lighter plug and socket with unitary current and heat responsive circuit breaker including a thrust-rod inserted therein. The circuit breaker is resettable from open to closed circuit condition by movement of the lighter plug and the thrust-rod.

---

The present invention concerns electric cigar lighters which are chiefly used on automobiles and similar vehicles. They comprise a receptacle or socket fixed on the instrument panel or other convenient part of the vehicle and also comprise a plug member, normally carried in the socket, removable therefrom for use and having a heating element which may be made incandescent electrically when required for use. In particular, the invention concerns circuit breaking devices mounted on or adjacent to the lighter to protect it against overheating or abnormal current draw with an attendant danger of fire.

Early recognition of the need for protective means resulted in a number of forms of fuses and circuit breakers mounted on or adjacent the socket and behind the mounting thereof, and which had to be replaced or reset by working behind that mounting. This was relatively simple before the space behind the mounting became crowded with accessories of one sort or another, as is the case with modern automobiles, which makes service prohibitively expensive.

Various attempts have been made to overcome the difficulty including, for example, auto-resetting circuit breakers, the incorporation of a protective device within the plug structure and also the use of a circuit breaker built on to the socket and resettable by insertion of a tool into an area very close to the normally live thermostatic contacts which cooperate with the heating element. The first cure is objectionable, as auto-resetting may exhaust the automobile battery in the case of an uncorrected short circuit. The second cure is inadequate as it affords no protection to the socket per se. The third cure is a potential source of further trouble as it is difficult to engage a small button at the bottom of a socket (which is usually about 1 3/16" diameter by 1 1/4" or more deep) without running the risk of damaging the above mentioned thermostatic contact, either by distortion or, if the tool is metallic, by burning through a short circuit.

Accordingly, it is an object of the present invention to provide a cigar lighter socket embodying a simple circuit breaker which may be reset by manipulation of the removable plug member, without the introduction of extraneous objects into the socket.

Another object is to provide a socket suited for use with or without the circuit breaker of this disclosure. These and other advantages are set forth in the following specification and the accompanying drawings of which:

Figure 1:
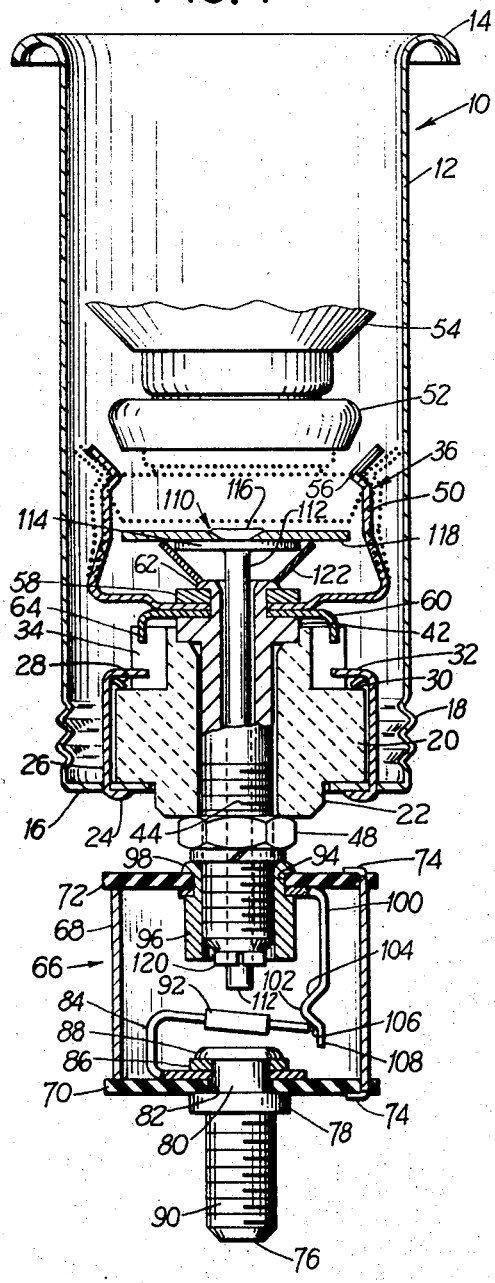
FIG. 1 is a longitudinal center-line section of an embodiment of the invention, showing the circuit breaker in closed circuit condition and the plug member in normal storage position, i.e., in open circuit position.

Turning first to FIG. 1. The numeral 10 indicates the socket assembly which preferably comprises a metallic tubular shell 12 having an out-turned bezel 14, a transverse end wall 16 and screw threads 18 for cooperative engagement with a conventional clamping shell (not shown); this structure serves as the ground terminal of the cigar lighter organization.

Carried within the shell 12 is an insulator 20, preferably of ceramic material, having a boss 22 passing through the wall 16 and is secured in place by the bent over ears 24 of retainer 26 whose inturned lip 28 engages the shoulder 30 of insulator 20; relative rotation of these parts is prevented by the engagement of fingers 32 of retainer 26, with the slots 34 in said insulator. The above recital of structure needs no elaboration as it is well known and in use on millions of automobiles. The live contact organization 36 comprises a hollow bolt 38 having an axially extending through-hole 40; it also has a radially extending shoulder 42 at one end, and screw threads 44 at the other. The said bolt passes through the insulator 20 via hole 46 and, by cooperation of the shoulder 42 and a nut 48 engaging screw threads 44, is thereon secured as shown, without contacting socket 12. A live contact 50 is shaped and adapted for engagement with the heating element cup 52 of the removable plug member 54 which is of known construction and not shown in explicit detail. The contact 50 preferably comprises a plurality of bimetallic thermostatic arms 56 adapted for conventional cooperative latching and unlatching engagement with the said heating element cup 52; it is mounted on the bolt 38 and firmly secured, together with a plain washer 58 and a special washer 60, against the shoulder 42 by the heading or roll-over 62, with the parts being placed in the order shown in the drawings. The special washer 60 has an axially extending tongue 64 shaped to enter the slot 34 of insulator 20 and prevent relative rotation of the above mentioned parts.

The protective circuit breaker 66, in the embodiment of the invention here illustrated and described, is located without the socket assembly, and is mounted by screw threaded engagement on bolt 38 in both electrical and heat conductive relationship. It, the circuit breaker 66, comprises a preferably metallic housing shell 68, closed at each end by insulating discs 70 and 72, which may be secured in place by a number of bent tongues 74 passing through suitable holes in the discs. A terminal stud 76 has a shoulder 78 and a shank 80 which passes through a suitable hole 82 in disc 70. Mounted on the shank 80 and on the side of the disc 70 remote from the shoulder 78 is a contact spring 84 and a metallic washer 86; the end of the shank is riveted over, as shown at 88, and secures the parts firmly together. The study 76 may be threaded as at 90 for convenience in attaching a suitable current carrying conductor (not shown). The contact spring 84 may be made from a flat strip of a good conductor such as Phosphor bronze or beryllium-copper of spring temper, and is biased away from stud 76 to at least the position shown in FIG. 2; and insulator 92, most conveniently made from elastomeric tubing, is secured to the contact spring, in the position shown in the drawings. Insulating disc 72 is centrally apertured and has passing therethrough a reduced diameter portion 94 of an internally threaded bushing 96 which is riveted over as at 98 to secure the bushing and disc 72 together along with the resilient bimetallic thermostatic contact arm 100, which is pierced to fit on the portion 86, located as shown in the drawings and in conductive contact with the bushing 96. The arm 100 is arranged to warp outwardly when heated; it has a knuckle or latch 102 which is shaped to form a cam or ramp 104 and a contact area 106 and, beyond them, a stop 108.

Extending from within the contact breaker 66 to a point between the arms of contact 50 is a thrust rod assembly 110 comprising a stem 112 located and sliding freely within the hole 40 of bolt 38; it also comprises a shoulder 114 and a short extension 116 which is spun over to secure the relight contact 118 tightly against the said shoulder. A snap ring 120 is seated in a suitable groove at the other end of the stem 112 to serve as a retainer and prevent the stud from escaping. A wave spring schematically indicated at 122, and preferably made from a good electrical conductor such as beryllium copper, is located on the stem 112 and resiliently engages both the contact 118 and the adjacent end of bolt 38, urging the snap-ring 120 against the other end of bolt 38 and prevents the parts rattling.

Operation

In use there are three cases to consider.

Case (a) where one energizes the lighter to light a cigarette or the like and where the energization follows the well known "pop-out" cycle.

Case (b) where one wishes to reheat the plug's heating element while the thermostatic contact arms 56 are still opened by heat and will not, for the time being, engage the heating element cup (52).

Figure 2:
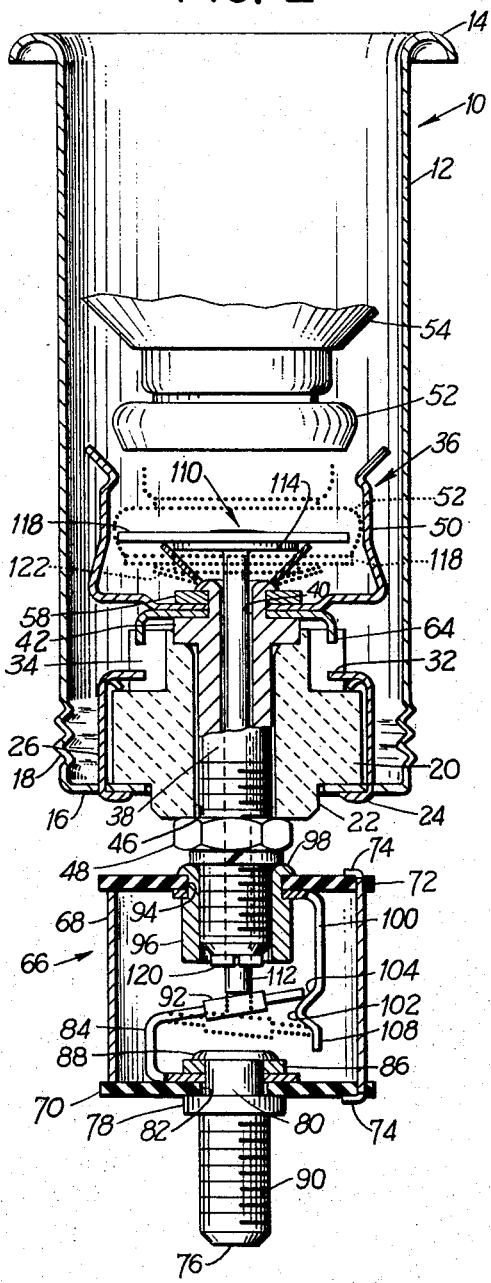
FIG. 2 is similar to FIG. 1 but shows the circuit breaker in open circuit condition and indicates by broken lines how the plug member may be moved to put the circuit breaker in closed circuit condition.

Case (c) where due to some abnormal event, the circuit breaker 66 has gone to the "open" condition and is ready for reclosing as shown in FIG. 2.

In Case (a) the heating element cup 52 is moved from the position shown in full lines to that indicated by broken lines in FIG. 1 and, as the contact arms 56 get hot they spread to the position also indicated by broken lines, and the plug pops out to its original position and is ready for use.

In Case (b) the heating element cup is moved a little further into the socket than in Case (a) until it touches the relight contact 118 where it will be energized by current flowing through bolt 38, wave spring 122 and contact 118; some current may also flow through stem 112 to contact 118. It may here be mentioned that the spring 122 is sufficiently strong to afford a very distinct feel of resistance when contact is made and hence there will be no tendency of the operator to press too far and interfere with the freedom of contact spring 84 to move to open circuit position if released by thermostat arm 100.

In Case (c), where the circuit breaker has opened and the plug member is in the position shown in FIG. 2 by full lines, the procedure will be to press the plug member into the socket beyond the position of Case (b) and, against the resistance of the wave spring 122, move the contact spring 84 to its initial position (indicated by broken lines in FIG. 2). After so closing the circuit, the plug would be manually released to assume the position indicated by the broken lines in FIG. 1, while the thrust rod would, under the urging of spring 122, resume its normal position as shown in FIG. 1.

It will be seen that by modification of a conventional cigar lighter and circuit breaker (see U.S. Patent 3,012,-120 to Gaudet), I have provided a reliable and convenient means of incorporating a protective circuit breaker which needs a deliberate action by the user to reset, which affords a signal (resistance of spring 122) that it is being reset and wherein normal operating movement of the plug will not interfere with the freedom of action of the circuit breaker. These advantages may be fully realized without the use of tools or manipulation of any part beyond movement of the removable plug member in its normal operating direction. In addition, it will be seen that, if desired, the socket structure may be used without the circuit breaker, which offers a very important commercial flexibility. It will further be seen that the circuit breaker is a unit suited to other possible uses if engaged by a suitable reset button or stud. It will be further noted that the relight contact 118 affords a shield against ashes, etc., which otherwise might fall from the heating element cup 52 and, entering hole 40, interfere with the operation of the thrust rod assembly.

Figure 3:
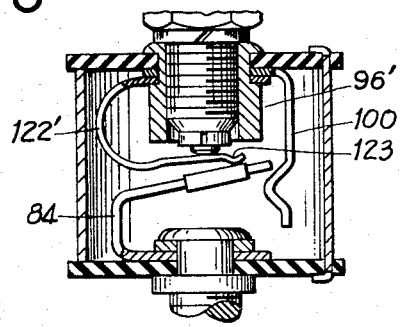
FIG. 3 is a longitudinal center line section of a modified form of the circuit breaker shown in FIG. 2 (in open circuit condition)

FIG. 3 shows a modification of the previously described construction. Here the wave spring 122 shown in the socket structure 10 of FIGS. 1 and 2 is dispensed with and a C-spring 122', located in the circuit breaker housing 66, takes its place. The C-spring 122' is mounted on bushing 96' together with the bimetal arm 100 and is shaped to bias stem 112 upward as in the earlier construction; it has a tip 123 shaped to contact insulator 92 without cutting it. The spring 122' does not form a link in the circuitry of the device.

Figure 4:
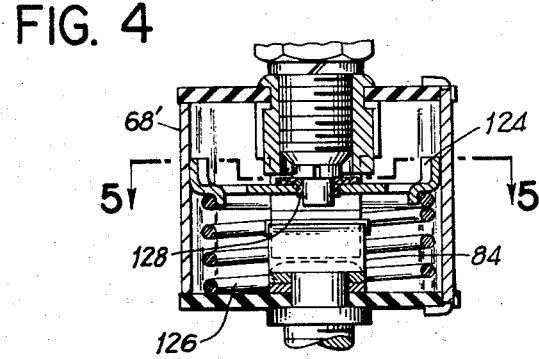
FIG. 4 is a longitudinal center line section of or further modification of the circuit breaker of FIGS. 1 or 2 and shown in closed circuit.
Figure 5:
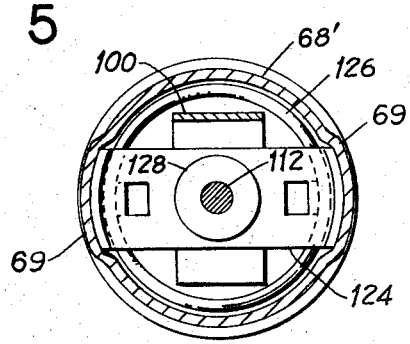
FIG. 5 is a transverse section of the structure of FIG. 4 as seen from line 5—5 of FIG. 4.

FIGS. 4 and 5 show another modification of the earlier described circuit breaker. As in the case of the modification shown in FIG. 3, the wave spring is discarded. The housing 68 of the preceding structures is replaced by one generally similar. The new housing 68' has a pair of longitudinal flutes 69 as clearly shown in FIG. 5, and a thrust plate 124 is shaped as shown, engage the stem 112 and to transmit to its the thrust of spring 126; a simple fiber bushing 128 insulates plate 124 and spring 126 from the circuit.

What is claimed is:

1. In the combination of a known type of electric cigar lighter plug and socket with a unitary current and heat responsive circuit breaker resettable from open to closed circuit condition by movement of a thrust-rod inserted therein, the novel improvement wherein:
   (a) said circuit breaker is mounted externally of said socket on a terminal thereof, and
   (b) said terminal comprises a hollow conductor having a multiarm contact within said socket for latching and unlatching engagement with a heating element on said plug and
   (c) said thrust rod is slidably supported within said conductor and extends therethrough from within said circuit breaker to a point between said arms and
   (d) at said point said thrust rod comprises an electrically conductive contact portion extending sufficiently transversely of said socket to serve as a relight contact for cooperation with said element and
   (e) said contact portion serves in a thrust transmitting relationship with said element for displacement toward and partially within said circuit breaker whereby said circuit breaker may, under appropriate circumstances, be changed from open circuit to closed circuit condition.

2. The combination of claim 1 wherein said terminal is suited for connection to a current carrying conductor in the absence of said circuit breaker.

3. The combination of claim 1 wherein said thrust-rod is spring urged toward said plug and wherein a radially extending component of said rod is shaped and adapted to engage the end of said terminal remote from said spring to limit the excursion thereof.

4. The combination according to claim 3 wherein said relight contact serves to shield the passage through said hollow terminal against the intrusion of ashes or other debris imported into said socket by said heating element.

5. A cigar lighter socket and circuit breaker combination of the type described comprising a tubular metallic socket open at one end for the reception and withdrawal of a plug member having a heating element and said socket at the other end being at least partially closed by an insulator having a hole therethrough with a hollow metallic conductor supported in said hole and extending from without to within said socket, a multi-armed bimetallic contact for current carrying latching engagement with said heating element and carried by said conductor within said socket and a heat and current responsive circuit breaker having a cavity and being attached by a hollow connector to said conductor at the end remote from said bimetallic contact, said breaker having a member accessible to, and movable from an open to a closed circuit position, by a thrust rod freely slidable in said hollow conductor, said thrust rod extending axillay from inside said circuit breaker to a point between the arms of said bimetallic contact and having an electrically conductive portion extending radially to afford a relight contact for said heating element, said rod being arranged and adapted to transmit thrust from said plug to said member to move the same from an open circuit to a closed circuit position and said relight contact further serving to guard the passage through said hollow conductor against the entrance of ashes and debris imported into said socket by said heating element.

6. A device according to claim 5 wherein travel of said thrust rod away from said circuit breaker is occasioned by the bias of a spring and the excursion of which is limited by a radially extending component of said thrust rod engaging said hollow conductor and wherein said heating element may be brought into engagement with said relight contact by manipulation of said plug member after said bimetallic contact has unlatched said heating element.

References Cited

UNITED STATES PATENTS

| | | | |
|---|---|---|---|
| 3,012,120 | 12/1961 | Gaudet | 219—265 X |
| 3,230,345 | 1/1966 | Horwitt | 219—265 |
| 3,238,353 | 3/1966 | Lybrook | 219—265 |
| 3,330,937 | 7/1967 | Horwitt | 219—265 |

BERNARD A. GILHEANY, *Primary Examiner.*

V. Y. MAYEWSKY, *Assistant Examiner.*

U.S. Cl. X.R.

200—116; 219—512